United States Patent [19]
Cecil

[11] Patent Number: 5,632,912
[45] Date of Patent: May 27, 1997

[54] RESISTANCE PROJECTION WELDING SYSTEM AND METHOD FOR WELDING A PROJECTION WELD NUT TO A WORKPIECE

[76] Inventor: Dimitrios G. Cecil, 1277 Ashover Dr., Bloomfield Hills, Mich. 48304

[21] Appl. No.: 491,228

[22] Filed: Jun. 16, 1995

[51] Int. Cl.$^6$ .................................................. B23K 11/24
[52] U.S. Cl. ..................... 219/110; 219/86.41; 219/117.1
[58] Field of Search .................................. 219/110, 109, 219/117.1, 86.41

[56] References Cited

U.S. PATENT DOCUMENTS

| | | | |
|---|---|---|---|
| 3,433,921 | 3/1969 | Peterson | 219/110 |
| 3,435,871 | 4/1969 | Johnson | 151/41.7 |
| 4,020,316 | 4/1977 | Schaft et al. | 219/103 |
| 4,028,522 | 6/1977 | Chihoski et al. | 219/109 |
| 4,296,304 | 10/1981 | Defourny | 219/86.41 |
| 4,317,980 | 3/1982 | Goodrich et al. | 219/117.1 |
| 4,441,006 | 4/1984 | Machida et al. | 219/85 CM |
| 4,447,700 | 5/1984 | Cohen | 219/117.1 |
| 4,461,944 | 7/1984 | Cohen | 219/110 |
| 4,542,277 | 9/1985 | Cecil | 219/109 |
| 4,609,805 | 9/1986 | Tobita et al. | 219/93 |
| 4,684,778 | 8/1987 | Cecil | 219/89 |
| 4,841,113 | 6/1989 | Hamada et al. | 219/110 |
| 4,861,959 | 8/1989 | Cecil | 219/89 |
| 4,970,361 | 11/1990 | Fuse | 219/86.41 |
| 4,984,171 | 1/1991 | Tsujii | 364/477 |
| 5,220,145 | 6/1993 | Cecil et al. | 219/110 |
| 5,225,647 | 7/1993 | Dufrenne | 219/86.51 |
| 5,248,869 | 9/1993 | DeBell et al. | 219/158 |
| 5,258,598 | 11/1993 | Alborante | 219/86.41 |
| 5,288,968 | 2/1994 | Cecil | 219/89 |
| 5,360,156 | 11/1994 | Ishizaka et al. | 28/17.5 |
| 5,376,766 | 12/1994 | Higgins | 219/61.5 |
| 5,393,950 | 2/1995 | Killian | 219/110 |

FOREIGN PATENT DOCUMENTS 54-27183  9/1979  Japan .
6-106360  4/1994  Japan .................................. 219/110

OTHER PUBLICATIONS

C.L. Tsai, W.L. Dai, D.W. Dickinson, "Analysis and Development of A Real–Time Control Methodology in Resistance Spot Welding", SAE Technical Paper Series, No. 910191.
A. Stiebel, C. Ulmer, D. Kodrack and B. Holmes, "Monitoring and Control of Spot Weld Operations", SAE Technical Paper Series, No. 860579.
C.L. Tsai, W.L. Dai, D.W. Dickinson and J.C. Papritan, "Analysis and Development of a Real–Time Control Methodology in Resistance Spot Welding", Welding Research Supplement, Dec. 1991.

(List continued on next page.)

*Primary Examiner*—Clifford C. Shaw
*Attorney, Agent, or Firm*—Brooks & Kushman P.C.

[57] ABSTRACT

A system and method is disclosed for monitoring and controlling a resistance projection welder for welding a projection weld nut to a workpiece. A displacement sensor measures the displacement of a welding electrode of a weld gun in real time during the welding procedure. A computer is coupled to the displacement sensor and determines whether the projection weld nut is correctly loaded between the workpiece and the welding electrode. The computer instructs a programmable logic controller (PLC) to trigger a weld controller to apply power to the welding electrode if the projection weld nut is correctly loaded onto the workpiece. The computer instructs the PLC to inhibit power if it determines the projection weld nut to be inverted, missing, or misaligned in order to allow for the removal and replacement of the projection weld nut. The computer further instructs the PLC to control and terminate the power to the welding electrode in real time in order to form a projection weld between the projection weld nut and the workpiece that is substantially similar to a predetermined projection weld. The computer processes the displacement data and provides a fault signal when the projection weld is unacceptable. A marker marks the unacceptable workpieces in response to the fault signal.

24 Claims, 10 Drawing Sheets

OTHER PUBLICATIONS

C.L. Tsai, O.A. Jammal, J.C. Papritan and D.W. Dickinson, "Modeling Resistance Spot Weld Nugget Growth", Welding Research Council, Bulletin 361, Feb. 1992, pp. 47–54.

David Bacon, "Controlling Resistance Welds With Deflection Feedback", Square D Company, Sep. 11, 1991.

A.E. Bentley, "Control of Pinch Welding Uses Quantitative Feedback Theory", Welding Journal, Jun. 1991, pp. 51–63.

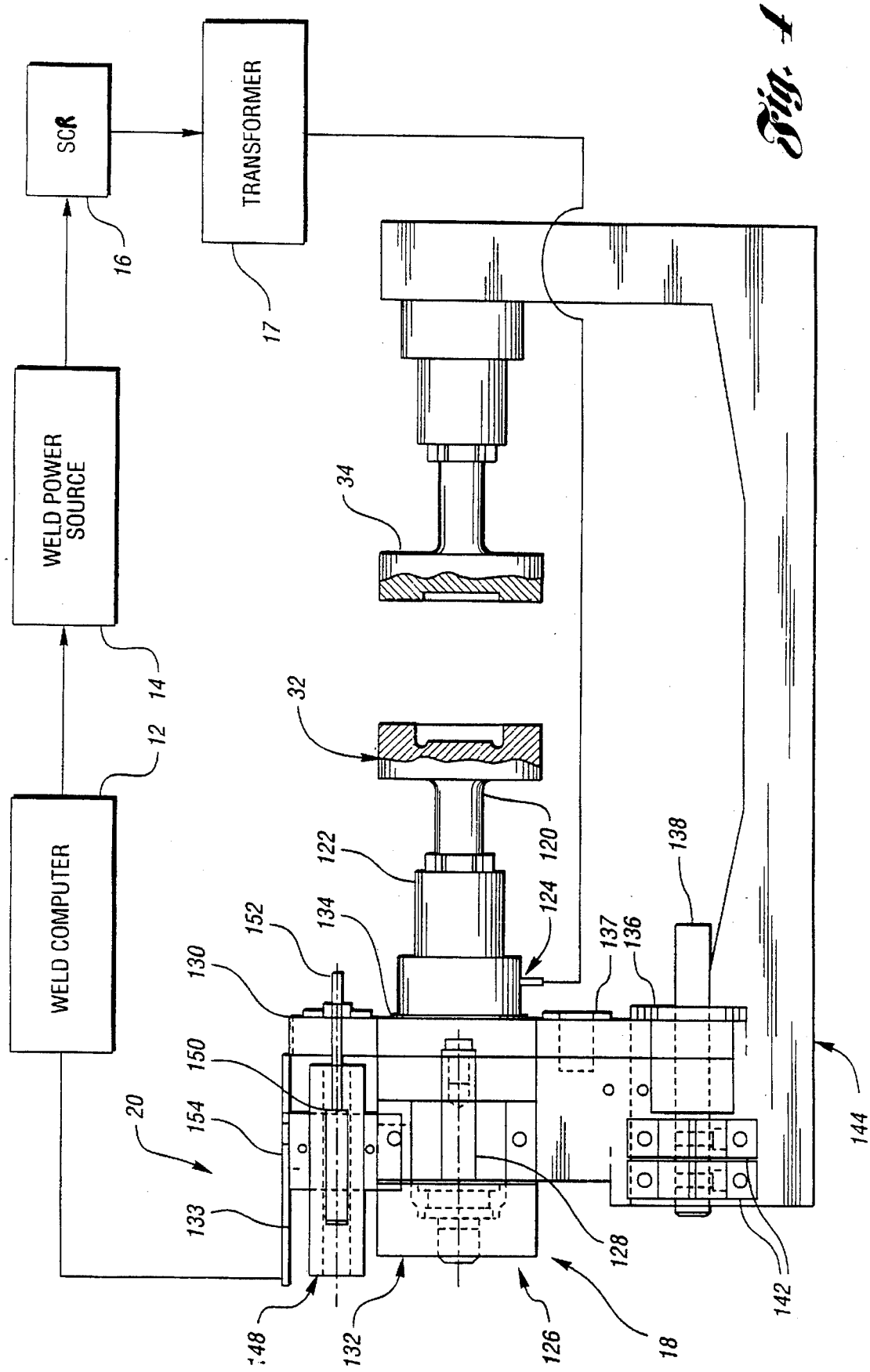

RESISTANCE PROJECTION WELDING SYSTEM AND METHOD FOR WELDING A PROJECTION WELD NUT TO A WORKPIECE

TECHNICAL FIELD

The present invention relates generally to a welding system, and more particularly to a resistance projection weld nut welding system and method.

BACKGROUND ART

It is a common manufacturing practice to secure nuts directly to sheet metal pieces through a welding process. In the manufacture of motor vehicles today, there are virtually hundreds of applications for such "projection weld nuts" which form attachments for air bag supports, door hinges, motor and transmission mounts, safety belts, and many other industrial applications.

Conventional resistance projection welding techniques employ a method by which metal workpieces are joined together at one or more predetermined points such as projections, embossments, or intersections. Workpieces are held together at the predetermined points under force by one or more electrodes. The contacting points are heated by a pulse of high amperage welding current generated by contact with an electrode. The resistance to the flow of welding current through the workpieces produces a weld at the faying surface of the joint. The projections concentrate the welding current and force at the weld area. The high current generates sufficient heat so that the metal surfaces reach a plastic state. The force applied before, during, and after the current forges the heated parts together so that coalescence occurs at the faying surface.

Projection weld nuts are commonly attached to sheet metal, usually over an opening in the sheet to permit a screw or other fastener to extend through and into the internal threads of the nut. One of the two surfaces of each projection weld nut typically has small projections. These projections are consistently measurable to obtain an exact dimension from projection weld nut to projection weld nut. The other surface of the projection weld nut is flat and smooth. The projection weld nut may have a pilot ring extending out from the same surface having the projections for the purpose of properly locating the projection weld nut relative to the sheet. The pilot ring is also consistently measurable to obtain an exact dimension from projection nut to projection nut.

For proper projection welding, the surface of the projection weld nut having the projections must engage the sheet. When an electrode conducts electric welding current through the projection weld nut and the workpiece, the electric current travelling through the flat surface of the projection weld nut is a low density current. The current at this interface is low density because it is able to travel through a large contact area defined by the entire flat surface of the projection weld nut. The low density current converts into a high density current through the projections. Since the projections are the only paths making electrical contact with the workpiece, the internal resistance to electric current flow is relatively much greater than the flat, smooth surface. The high internal resistance causes intense heat to develop through the projections. The heat melts the sheet causing the projections to penetrate the metal surface when force is applied. After the current terminates, the projection weld nut is welded to the workpieces as a result of coalescence.

A problem arises when the projection weld nut is loaded onto the workpiece in an upside down or an inverted position. This problem can occur when using a vibrational nut feeder for supplying the projection weld nuts. As explained above, the flat surface provides a relatively low resistance path because all of its surface area is in contact with the workpiece. Consequently, the smooth surface of the projection weld nut inadequately penetrates the workpiece due to the lack of heat generated. These weakly welded projection nuts can easily escape detection during the projection welding process.

A primary disadvantage associated with existing resistance projection weld nut welding systems is the fact that it is unknown when a projection weld nut has been welded upside down or laterally out of position with respect to an aperture on the workpiece. This disadvantage exposes itself when a failure occurs during an attempt to screw a bolt into the welded projection nut or subsequently when the nut is loaded. Many times the required torque applied to secure the bolt to the threads of an inverted welded projection nut breaks the weak weld and the projection nut spins off the workpiece. If the projection nut was welded out of position, it is impossible to extend the bolt through the aperture on the workpiece. Therefore, it is extremely desirable to not apply electric power to either an inverted or misaligned projection weld nut or to at least terminate the power before the projection nut has been heated sufficiently to weld. Early detection allows for the projection weld nut to be easily removed while the workpiece has little or no damage and can be reused.

A second problem in resistance welding is in controlling the weld process satisfactorily in order to consistently produce good welds. Many different factors must be controlled, such as voltage, current, pressure, heat loss, shunting, water temperature and electrode wear, as well as the thickness and composition of the workpiece material. Many of these variables are difficult to consistently control because of contaminants at the faying surfaces such as dirt, grease, oil or paper. Improper welding conditions can cause defective welds due to expulsion and low or over penetration of the weld nut projections. Expulsion occurs when an excessive application of power blows out the projections at the faying surfaces. Over penetration results from the weld current being too strong or applied for too much time. Too little power causes low penetration. Defectively welded projection weld nuts have distinguishing features from good welds such as being weaker, being misaligned, weld expulsion bonded to its internal threads rendering the projection nut non-usable, and other defects.

Several attempts have been made to automatically control resistance projection welding processes. For example, some techniques have been designed to regulate the amount of energy used during the weld cycle. To this end, current sensors and voltage regulators have been incorporated into feedback systems to compare the detected levels with certain preset reference values. These feedback systems are disadvantageous because they do not directly detect physical characteristics of the weld itself, but instead rely upon detection of secondary parameters. This can lead to poor weld quality when uncontrolled parameters vary from nominal operating conditions.

A product that has weak welds can fail to perform under extreme stress, fail at some point during the course of normal operation or can break after other parts have been welded to it. A welded product such as a car seat, automobile engine cradle, or an automobile frame can easily have dozens or even hundreds of separate welds. Often the projection weld nuts welded to a workpiece are fabricated as a box section such as an automobile motor/transmission mount. Obviously, it is very expensive and impractical to repair or replace a bad weld after a unit has been welded together and assembled in a vehicle. Usually the entire assembly is removed and scrapped.

Many products such as an air bag support will perform only once under extreme stress conditions during its lifetime. If the air bag is supported by defective welds, it may not perform its intended function. Finally, if the incorrectly welded projection nut has enough strength to allow the required torque at assembly to hold, it can fail later while in use due to structural vibrations or other stresses transferred to this weak joint.

A further obstacle in resistance welding occurs when an electrode becomes fused to a welding surface after completion of a weld. This condition is known as a "stuck gun condition". If the welding system does not detect the stuck gun before attempting to move the electrodes from a closed welding position to an opened position, extensive damage to the electrodes, weld gun, a work cell, and even human weld operators may occur.

Another consideration in resistance welding is to ensure that the electrodes apply welding current to the projection weld nut once and only once. The strength of the weld between a projection weld nut presently welded to a workpiece is substantially weakened with the application of subsequent electric welding power. The subsequent welding power causes the projections to overheat, and thus become brittle.

SUMMARY OF THE INVENTION

It is an object of the present invention to determine whether the desired surface of a projection weld nut is in a proper fit up position with a workpiece prior to applying weld power.

Another object of the present invention is to ensure that a projection weld nut forms a strong weld with a workpiece, to monitor and to control the formation of the weld, and to analyze the quality of the weld.

A further object of the present invention is to determine whether a projection weld nut is properly aligned with a workpiece prior to applying weld power.

Still another object of the present invention is to check for a stuck gun condition before moving the electrodes from a closed welding position to an opened position.

Still yet a further object of the present invention is to prevent the shorting of the welding electrode by avoiding the application of electrical power to an electrode not engaged with a projection weld nut.

Still yet another object of the present invention is to prevent the subsequent application of electric power to a projection weld nut presently welded to a workpiece.

These objects and other objects and advantages of the present invention are achieved by a system and method for welding a projection weld nut to a workpiece made in accordance with the present invention. The system includes a weld power source for supplying power. A weld gun having a welding electrode is coupled to the weld power source. The welding electrode is moveable between a closed welding position forming an electrical welding contact through the projection weld nut and the workpiece, and a spaced apart opened position for receiving and removing the projection weld nut and the workpiece. A programmable logic controller (PLC) is coupled to the weld gun and to the weld power source. A displacement sensor is coupled to the weld gun for generating a signal that is responsive to an orientation of the welding electrode relative to the workpiece. A computer is coupled to the displacement sensor, the PLC, and the weld power source. The computer transmits a control signal to the PLC for controlling the power from the weld power source to the welding electrode as a function of the displacement sensor signal.

Initially, a nut feeder supplies a projection weld nut to the welding electrode in the opened position. The PLC then triggers the welding electrode to the closed position. The computer determines whether the orientation of the welding electrode relative to the workpiece is within or outside a specified acceptance region. The orientation is initially a function of which surface of the projection weld nut engages the welding electrode. If the orientation is within the acceptance region, the computer transmits a control signal to the PLC for initiating an application of electrical power from the weld power source to the welding electrode. If the orientation is outside the acceptance region, the computer transmits the control signal to the PLC for inhibiting the application of electrical power from the weld power source to the welding electrode.

While the electrical power is applied to the welding electrode, the computer monitors the electrode orientation. In response to the orientation moving during the welding procedure, the computer transmits the control signal to the PLC for varying the amount of power applied by the weld power source to the welding electrode. The computer varies the power in order for the orientation to substantially simulate a predetermined displacement. The computer terminates the electrical power if the orientation does not correspond to the predetermined displacement.

These and other features, aspects, and advantages of the present invention will become better understood with regard to the following description, and accompanying drawings.

BRIEF DESCRIPTION OF THE DRAWINGS

FIG. 4 is a block diagram of the welding system with a detailed plan view of an illustrative resistance projection welding gun having a pair of projection electrodes and a retrofitted displacement sensor;

FIG. 6b is an exploded cross sectional view taken along the line X—X' in FIG. 6a;

FIG. 7d is a cross-sectional view of electrodes having an improper distance between them because the projection weld nut is inverted on the workpiece.

DETAILED DESCRIPTION OF THE INVENTION

Figure 1:
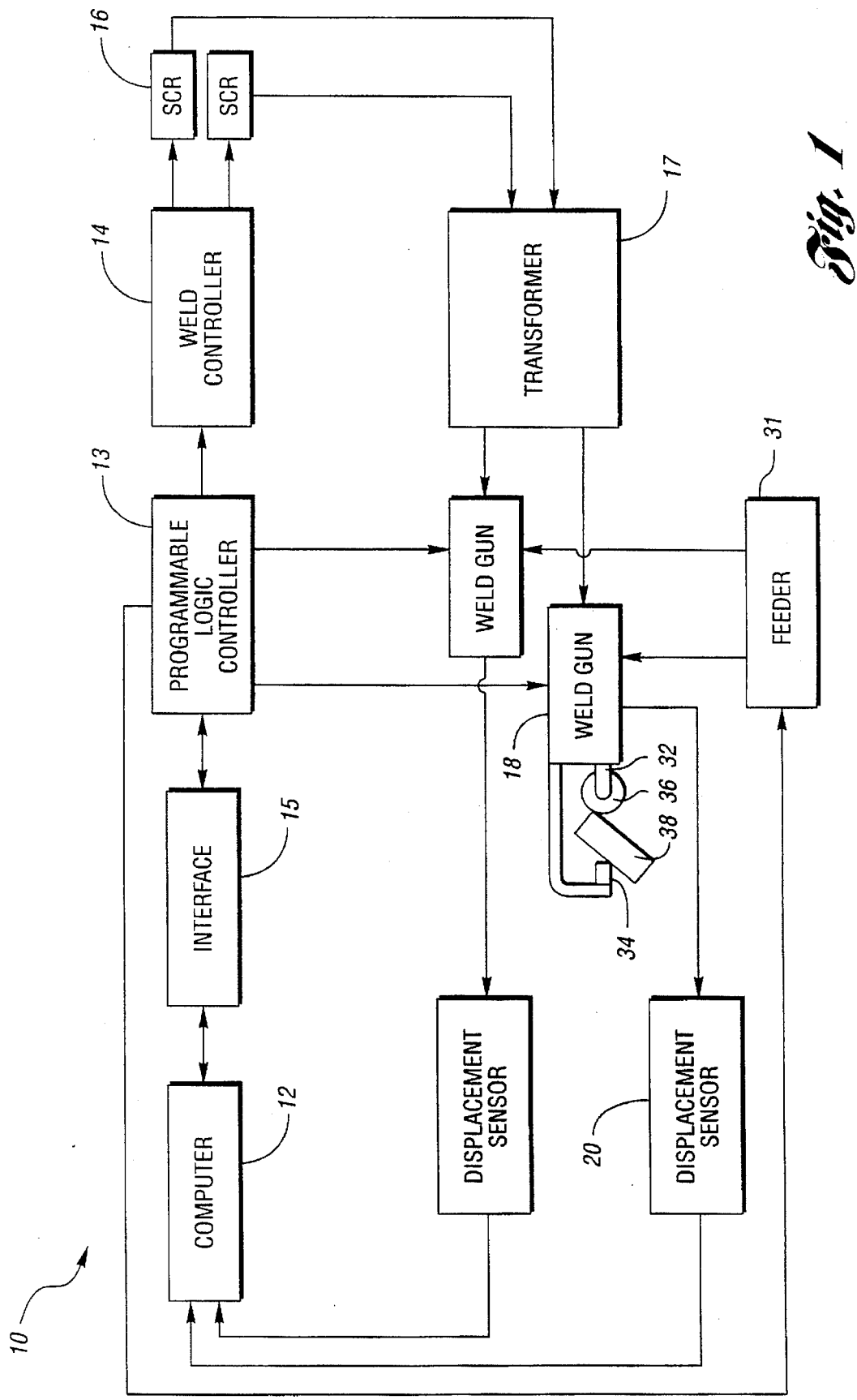
FIG. 1 is a block diagram of a resistance projection welding system made in accordance with the present invention.

FIG. 1 illustrates a block diagram of a resistance projection welding system 10. Welding system 10 includes a computer 12, a programmable logic controller (PLC) 13, a weld controller 14, an interface 15, a silicon controlled rectifier (SCR) 16, a transformer 17, a weld gun 18, and a displacement sensor 20. As is well known in the art, welding system 10 includes many readily available components. For example, PLC 13 may be obtained from a manufacturer such as Allen Bradley. Weld controller 14 is manufactured by Weltronics, Medar, or Square D. Farrah makes SCR 16. Roman produces transformer 17 and weld gun 18 can be obtained from Milco, Sayair, Grossel, OHMA or Centerline.

Weld gun 18 has a first electrode 32 and a second electrode 34. First electrode 32 engages a projection weld nut 36. Second electrode 34 engages a workpiece 38. Projection weld nut 36 is to be welded onto workpiece 38. As is known in the art, weld gun 18 may be a single electrode system.

According to the preferred procedure, computer 12 transmits control signals to PLC 13 through interface 15. Weld controller 14 and weld gun 18 are operatively responsive to PLC 13. Weld controller 14 is provided with SCR 16 which couples weld controller 14 to weld gun 18 via transformer 17. Weld controller 14, SCR 16, and transformer 17 act together to supply electric current to electrodes 32 and 34 in weld gun 18. Displacement sensor 20 monitors the relative position between the weld electrodes in a two electrode weld gun or the position of the electrode relative to the workpiece in the single electrode system. Displacement sensor 20 is a transducer such as a linear variable displacement transducer (LVDT) described in U.S. Pat. Nos. 5,288,968, 5,220,145 and 4,542,277, which are incorporated herein for the purpose of describing the sensor and related control logic. Displacement sensor 20 provides the electrode position data to computer 12 through a device such as an analog-to-digital converter. A vibrational nut feeder 31 responsive to PLC 13 supplies projection weld nuts to weld gun 18. Of course, as illustrated in FIG. 1, a plurality of weld guns may be operated and coordinated by welding system 10. The workpieces move from each weld gun along a production line (not shown). Each weld gun is coupled to an SCR and a displacement sensor. Each weld gun is individually coupled to computer 12, PLC 13, and weld controller 14 as described above.

Briefly describing a general overview of the operation of welding system 10, computer 12 executes a supervisory routine which triggers PLC 13 to perform its functions if projection weld nut 36 is correctly loaded onto workpiece 38. Functions of PLC 13 include opening and closing weld gun 18, automatically positioning weld gun 18 in various positions, turning weld controller 14 on and off, supplying cooling water to weld gun 18, controlling the clamping pressure on electrodes 32 and 34 of weld gun 18, controlling nut feeder 31 for supplying projection weld nut 36 to weld gun 18, and controlling automation for moving workpieces along the production line. In an alternative embodiment, computer 12 can be programmed to directly perform the functions of PLC 13. In another embodiment, computer 12 may be controlled through a computer communication network.

FIGS. 2(a—e) illustrate how computer 12 determines whether projection weld nut 36 is correctly loaded onto workpiece 38. First, FIG. 2a illustrates projection weld nut 36 separated from workpiece 38. Projection weld nut 36 has an upper surface 40 and a lower surface 42. Lower surface 42 has projections 44 that are adapted to bear against workpiece 38. Projection weld nut 36 also has a threaded bore 46 for allowing a bolt or fastener to extend through projection weld nut 36 and an aperture 48 in workpiece 38.

Figure 2A:
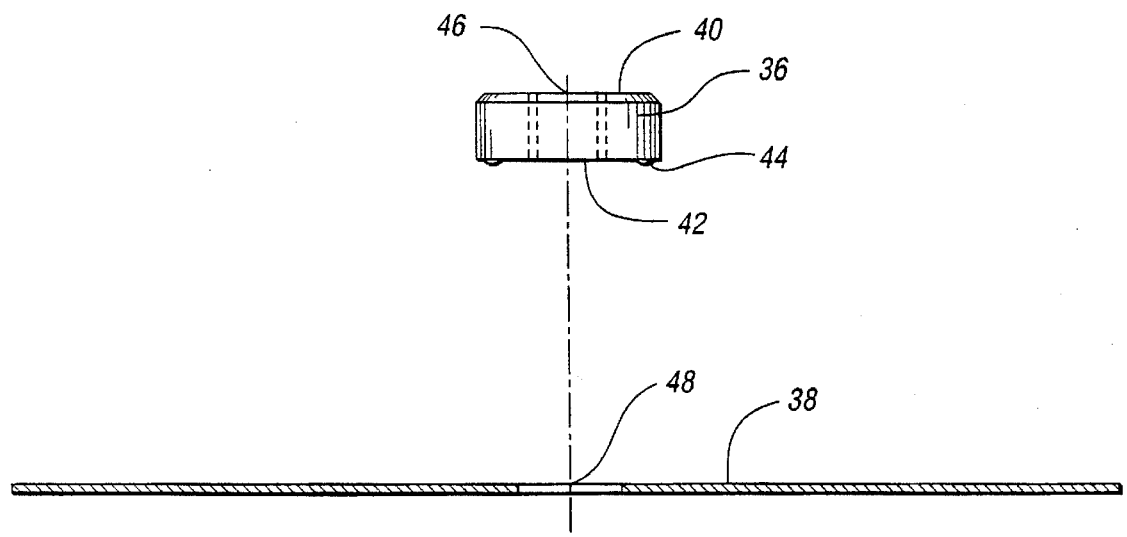
FIG. 2a is a side view of a projection weld nut and a workpiece.
Figure 2B:
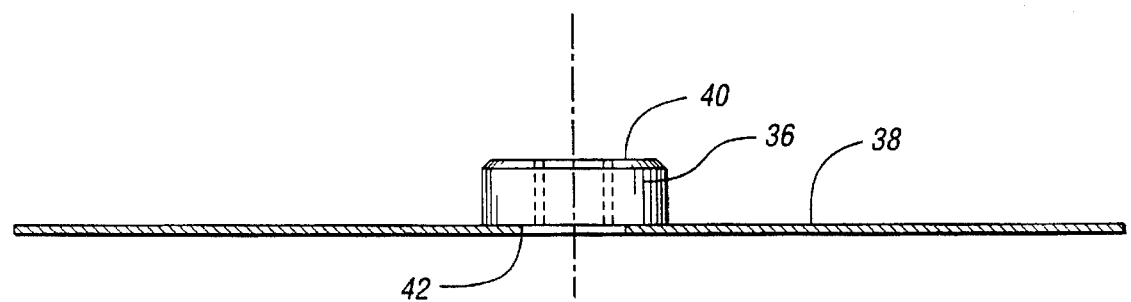
FIG. 2b is a side view of the projection weld nut properly welded on the workpiece.

FIG. 2b illustrates a side view of projection weld nut 36 properly welded on workpiece 38. Projections 44 of lower surface 42 have penetrated into workpiece 38 by the intense heat created because of the high density electric current.

Figure 2C:
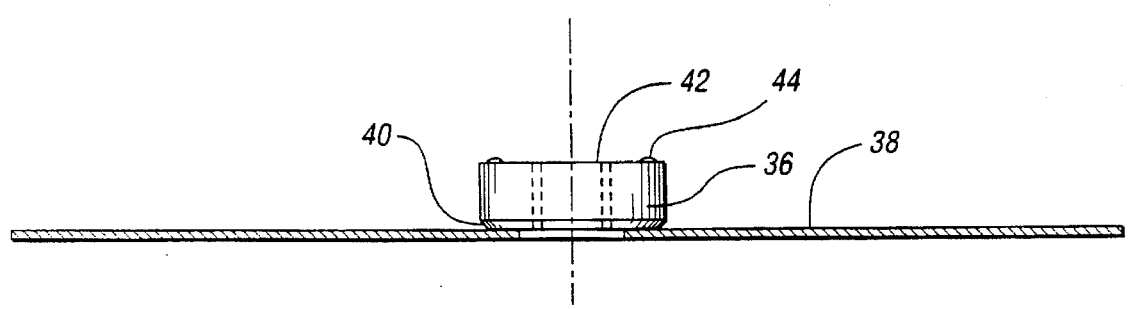
FIG. 2c is a side view of the projection weld nut welded in an inverted position on the workpiece.

FIG. 2c illustrates a side view of projection weld nut 36 welded onto workpiece 38 in an inverted position. Projection weld nut 36 is inverted when upper surface 40 is positioned onto workpiece 38. As discussed earlier, upper surface 40 provides a low resistance path because its entire surface makes electrical contact with workpiece 38. The low electric current density inadequately heats upper surface 40 forming a weak projection weld with workpiece 38.

Figure 2D:
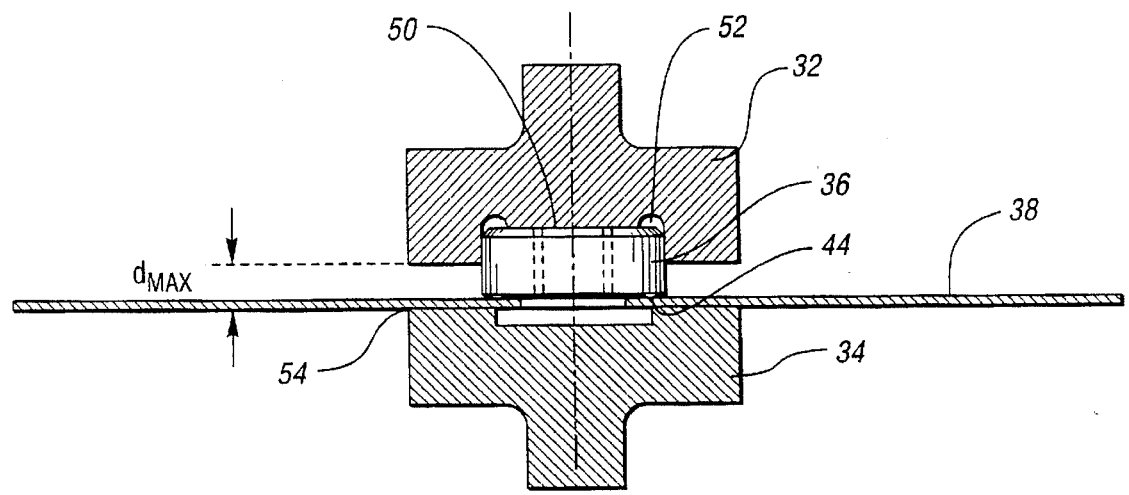
FIG. 2d is a cross-sectional view of electrodes having a distance between them indicative of a projection weld nut being correctly positioned on the workpiece prior to welding.

FIG. 2d is an illustration of a cross-sectional view of electrodes 32 and 34 having a distance $d_{MAX}$ between them indicative of projection weld nut 36 being correctly positioned on workpiece 38 prior to welding. First electrode 32 has a contact face 50 for engaging projection weld nut 36. Contact face 50 has an annular groove 52 that is the same size as projections 44. Second electrode 34 has a contact face 54 that engages workpiece 38. Electrodes 32 and 34 are shown in a closed welding position forming an electrical welding contact between them through projection weld nut 36 and workpiece 38. The distance between electrodes 32 and 34 is a function of projections 44 supporting projection weld nut 36 above workpiece 38.

Figure 2E:
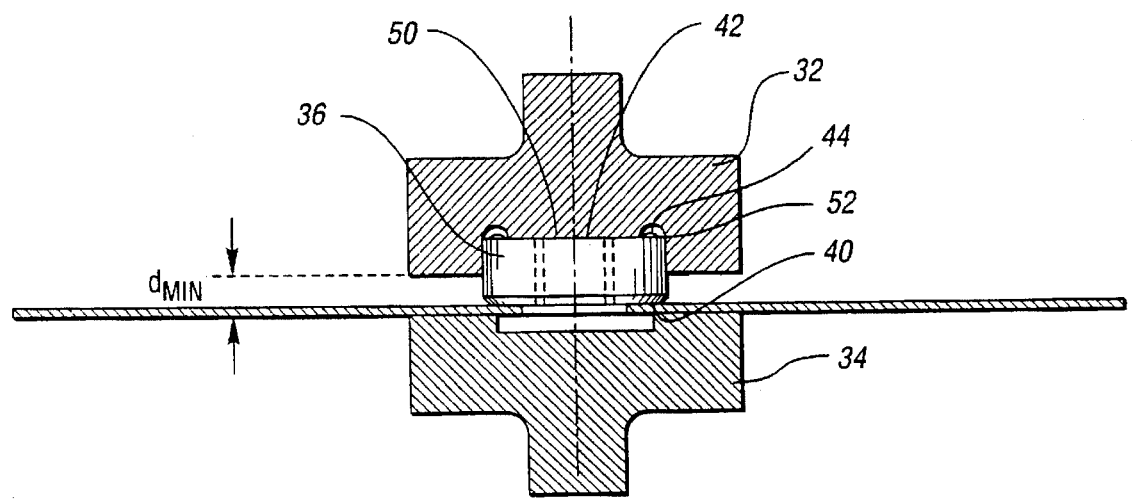
FIG. 2e is a cross-sectional view of electrodes having a distance between them indicative of the projection weld nut being in an inverted position on the workpiece prior to welding.

FIG. 2e is a cross-sectional view of electrodes 32 and 34 having a distance $d_{MIN}$ between them indicative of projection weld nut 36 being in an inverted position on workpiece 38 prior to welding. The inverted position allows projections 44 to fit into annular groove 52. Because projections 44 are enclosed by annular groove 52, the distance $d_{MIN}$ is smaller than the distance $d_{MAX}$ by the length of projection 44.

As can be appreciated from FIGS. 2(a—e), it can be determined which surface of projection weld nut 36 engages workpiece 38 as a function of the distance between electrodes 32 and 34. Specifically, $d_{MAX}$ indicates projection weld nut 36 to be correctly loaded. The distance $d_{MIN}$ indicates that projection weld nut 36 is incorrectly loaded. When the distance between electrodes 32 and 34 is negligible, electrodes 32 and 34 may be directly engaged with each other causing a certain electrical short if electrical power is applied. Also, a distance in a range near $d_{MIN}$ indicates that projection weld nut 36 has already been welded to workpiece 38. Thus, $d_{MAX}$, $d_{MIN}$ or other distances can be used as an indicator to decide whether to apply or inhibit welding power. Furthermore, if the distance between electrodes 32 and 34 remains constant during the application of power, this could also be used to indicate that projection weld nut 36 is inverted due to lack of penetration.

Figure 3:
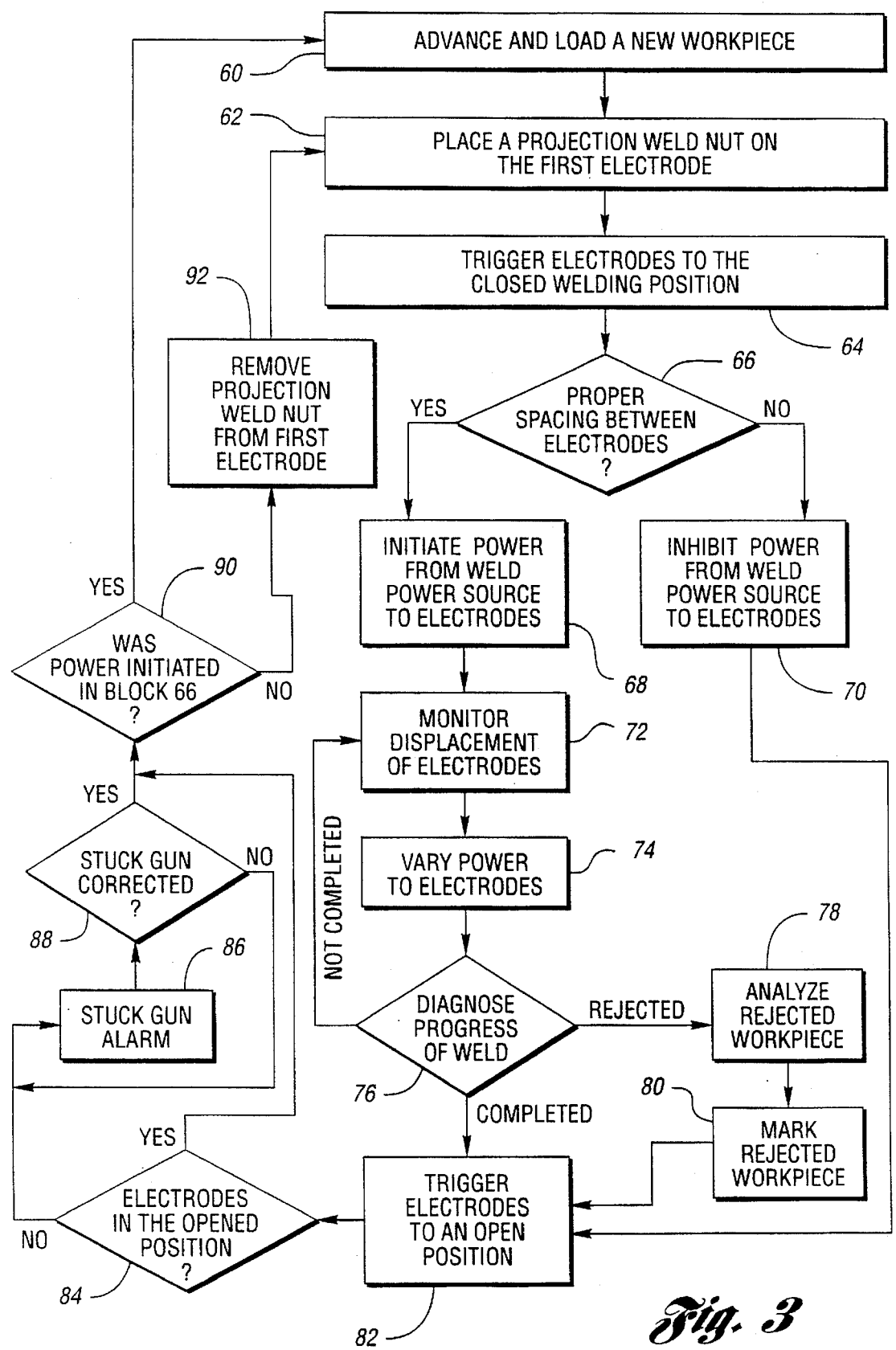
FIG. 3 is a flow chart for a system for projection welding a projection weld nut to a workpiece in accordance with the present invention.

With reference to FIGS. 1 and 3, a flow chart for a weld routine executed by welding system 10 is shown. Initially, PLC 13 instructs a production line to advance and load a new workpiece into weld gun 18 as shown in advance block 60. PLC 13 then triggers nut feeder 31 to supply projection weld nut 36 to first electrode 32 in block 62. Upon approval by computer 12, PLC 13 commands electrodes 32 and 34 to shift to the closed welding position in block 64. The step of closing the electrodes encompasses the step of advancing electrodes 32 and 34 of weld gun 18 upon projection weld nut 36 and workpiece 38.

In spacing condition block 66, computer 12 determines the initial distance between first electrode 32 relative to second electrode 34 after receiving the distance data from displacement sensor 20. If the distance between electrodes 32 and 34 is $d_{MAX}$, then projection weld nut 36 is correctly loaded onto workpiece 38 and computer 12 will instruct PLC 13 to trigger weld controller 14 for applying weld power as shown in initiate power block 68. SCR 16 applies the power to electrodes 32 and 34 through transformer 17.

If computer 12 determines the distance between electrodes 32 and 34 not to be within an acceptable range of $d_{MAX}$, for example, by reading the distance to be $d_{MIN}$, then computer 12 instructs PLC 13 to command weld controller 14 not to apply power to electrodes 32 and 34. This sequence is shown in inhibit power block 70. In addition to projection weld nut 36 being inverted, the distance between electrodes 32 and 34 may be outside of the acceptable range of $d_{MAX}$ because projection weld nut 36 has not been placed on either of electrodes 32 and 34 or because projection weld nut 36 has already been welded to workpiece 38.

After initiating welding power in block 68, computer 12 monitors displacement sensor 20 in monitor displacement block 72 to determine the relative positions of electrodes 32 and 34 in real time during the application of welding current. The positions of electrodes 32 and 34 will change depending upon the penetration of projection weld nut 36 into workpiece 38. Vary power block 74 allows computer 12 to control the weld quality in real time by varying the power applied to electrodes 32 and 34. Computer 12 continuously varies the welding time in order for the displacement of electrodes 32 and 34 to substantially simulate a predetermined displacement. Since projection weld nut strength is a function of electrode displacement, the predetermined displacement can be chosen to correspond to the strongest possible weld. The repeated scanning of displacement sensor 20 over the duration of the weld allows computer 12 to obtain a time sequence of measured positions of electrodes 32 and 34. Computer 12 uses the time sequence displacement data to determine in diagnose block 76 whether the weld has been completed or whether it is defective.

Computer 12 determines the projection weld to be completed when the displacement of electrodes 32 and 34 is substantially similar to the predetermined displacement. Computer 12 then commands PLC 13 to instruct weld controller 14 to inhibit welding power.

If the weld has not been completed, meaning that the displacement of electrodes 32 and 34 has not yet reached the predetermined displacement but is currently within an acceptable tolerance, then the routine branches back to monitor displacement block 70. The cycle of monitoring electrode displacement while applying power continually repeats until the weld is completed or is defective.

With reference still to FIGS. 1 and 3, computer 12 determines the weld to be defective in block 76 when the electrode displacement is not within an acceptable tolerance range of the predetermined displacement. As the case for a completed weld, computer 12 commands PLC 13 to instruct weld controller 14 to inhibit power. Diagnose block 76 then proceeds to analyze reject block 78. Analyze reject block 78 determines why the weld is defective. Possible reasons for defective welds include a plurality of fault conditions such as low projection penetration due to lack of generated heat because of a failed transformer, high penetration due to welding power fluctuations, expulsion, or other characteristics indicative of an inadequate weld. Analyze reject block 78 detects the fault condition by comparing the measured time sequence displacement data with the predetermined displacement.

After determining the fault condition, reject block 78 directs the process to marking block 80 which marks the workpiece having the defective weld. Marking block 80 could mark the defective workpiece with data indicating time, date, count number of the workpiece along the production line or other identifying indicia. Marking block 80 could use paint, bar coding, laser, or stamping to mark the workpieces.

After the projection weld has been completed or rejected, computer 12 instructs PLC 13 to shift electrodes 32 and 34 to the opened position as indicated by open block 82. Also, if computer 12 commanded PLC 13 to inhibit power from weld controller 14 to electrodes 32 and 34 in block 70, then power block 70 also proceeds to open block 82.

Conditional open block 84 determines if electrodes 32 and 34 are shifted to the opened position. If any one of electrodes 32 and 34 are not in the opened position, meaning that at least one electrode is fused to a surface of projection weld nut 36 or workpiece 38 which are now welded together, then a stuck gun alarm is activated in stuck alarm block 86. Further execution of the routine is halted until the stuck gun condition is corrected, as indicated by conditional stuck block 88.

If electrodes 32 and 34 are in the opened position, then computer 12 determines whether power was applied to electrodes 32 and 34 during the sequence of spacing condition block 66 as shown in conditional block 90. If computer 12 inhibited power because it determined the initial distance between electrodes 32 and 34 to be improper due to an inverted projection nut, then the inverted nut is removed from first electrode 32 in block 92. Block 92 then directs the process to block 62 where nut feeder 31 places a new projection weld nut 36 on first electrode 32, thus repeating the welding process on the same workpiece. Of course, the old inverted projection nut could be reoriented instead of being replaced with a new projection nut.

If computer 12 initiated the welding power in block 66, then conditional block 92 proceeds to advance block 60. PLC 13 advances and loads a new workpiece into weld gun 18. The welding process then repeats by placing a new projection weld nut on first electrode 32. Of course, if the previous workpiece was defective, it could be removed from the production line before advancement of all of the workpieces.

Now turning to FIG. 4, a block diagram of welding system 10 with a detailed view of an illustrative weld gun 18 having a first electrode 32 and a second electrode 34 with a retrofitted displacement sensor 20 is shown. First electrode 32 is connected to electrode shaft 120. Electrode shaft 120 is secured by means of an electrode holder 122 which is connected to a terminal 124 for supplying a voltage to first electrode 32 and second electrode 34. Terminal 124 is electrically coupled in a closed circuit with SCR 16. First electrode 32 is positionable by means of fluid-powered cylinder 126. This cylinder consists of a cylinder rod 128 rigidly attached to an electrode positioning bracket 130 and cylinder housing 132.

Displacement sensor 20 comprises electrode positioning bracket 130 and a linear variable displacement transducer (LVDT) 133 used for determining the displacement of first electrode 32 relative to second electrode 34 or to workpiece 38 depending upon whether a two electrode or a single electrode weld gun is utilized. Electrode positioning bracket 130 is secured to electrode holder 122. Electrode positioning bracket 130 is electrically isolated from electrode holder 122 by an insulator 134. This insulation is important, because of the high currents produced in the welding process and the resulting high intensity magnetic fields which will be present. Electrode positioning bracket 130 is stabilized by means of a shaft assembly 136 which consists of a shaft 138, a bushing 137 which holds shaft 138 and is affixed to electrode positioning bracket 130, and shaft clamps 142 which affixes shaft 138 to an arm 144. This shaft 138 eliminates rotation of electrode positioning bracket 130 in the plane radial to cylinder 128. Although shaft assembly 136 is beneficial in providing rotational stability of electrode positioning bracket 130, its inclusion is not required in alternative embodiments of the present invention.

The position of electrode positioning bracket 130 and thus the position of first electrode 32 is determined by LVDT 133. Alternatively, a laser based translational sensor could also be employed. LVDT 133 consists of a transducer body 148 having a cylindrical core receptacle, a transformer core 150 and a core rod 152. Transducer body 148 is attached to arm 144 by means of an isolating clamp 154. Isolating clamp 154 is constructed of phenolic material so as to insulate transducer body 148 from arm 144. This insulation is important, since LVDT 133 is susceptible to induced noise. The high currents and magnetic fields previously mentioned require transducer 133 to be insulated in this manner. For the same reason, transducer body 148 is preferably sheathed in stainless steel which is substantially not magnetic. Further, core rod 152 is preferably constructed of stainless steel.

Figure 5A:
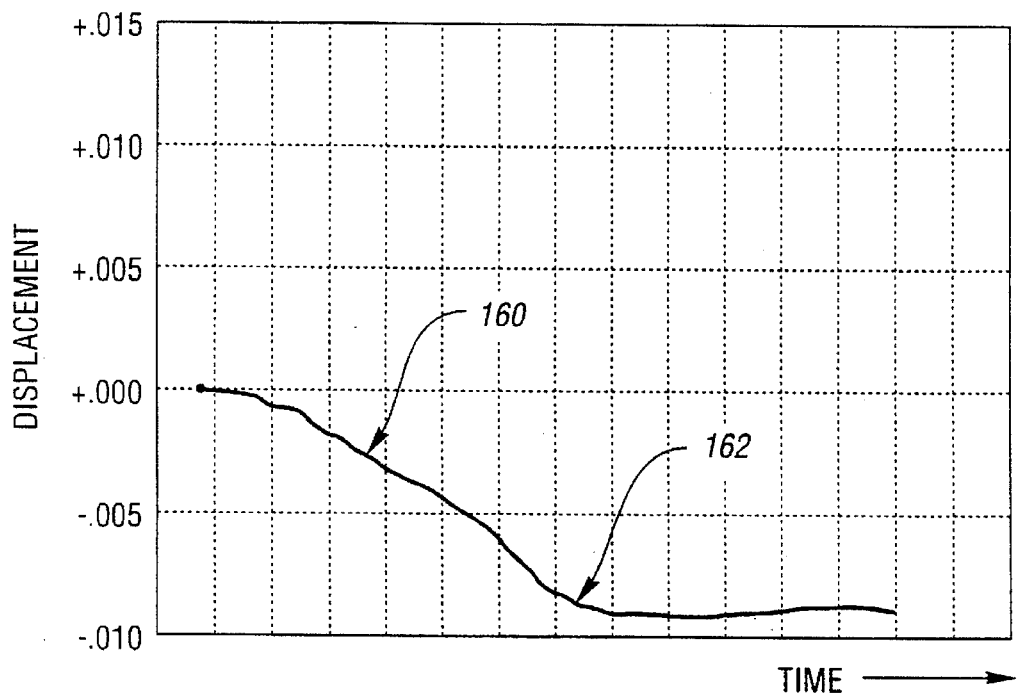
FIGS. 5(a-d) is a series of electrode displacement curves which compare a good weld to three weld-fault conditions.

During the welding process, computer 12 monitors the amount of penetration by projections 44 into workpiece 38 using displacements of electrodes 32 and 34 via displacement sensor 20. FIG. 5a presents the displacement voltage characteristic, as given by LVDT 133 for a representative good projection weld. As time increases, projections 44 penetrate into workpiece 38 as shown by negative displacement slope 160. Weld voltage is cut-off at 162 once sufficient weld penetration is obtained. The weld voltage to weld gun 18 is cut-off after a fixed amount of penetration so as to avoid expulsion, a condition whereby penetration is taken to such a point that the weld material is forced out of a weld junction. Electrodes 32 and 34 are held in place for a short interval of time before being retracted 172 to ensure proper solidification of the weld.

Figure 5B:
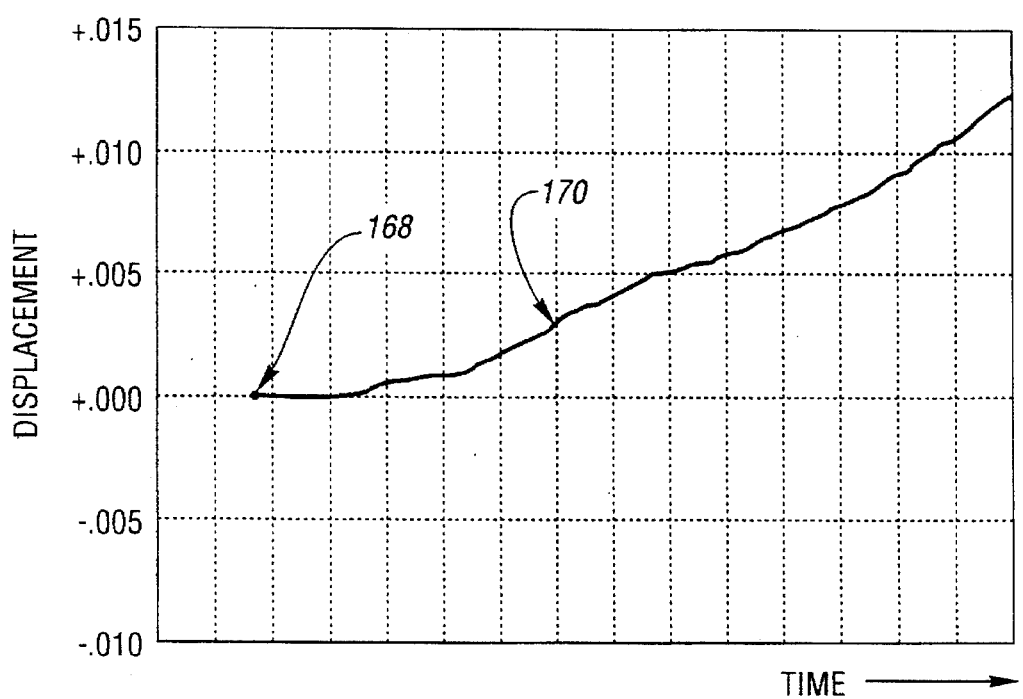

An expansion weld curve is shown in FIG. 5b. This condition occurs when projection weld nut 36 is inverted, presently welded, or projections 44 are not in contact with workpiece 38. There is no penetration by projections 44 into workpiece 38. Electrodes 32 and 34 are then moved to the opened position after the application of power at 168 as shown by positive displacement slope 170 and an appropriate fault signal is provided by computer 12.

Figure 5C:
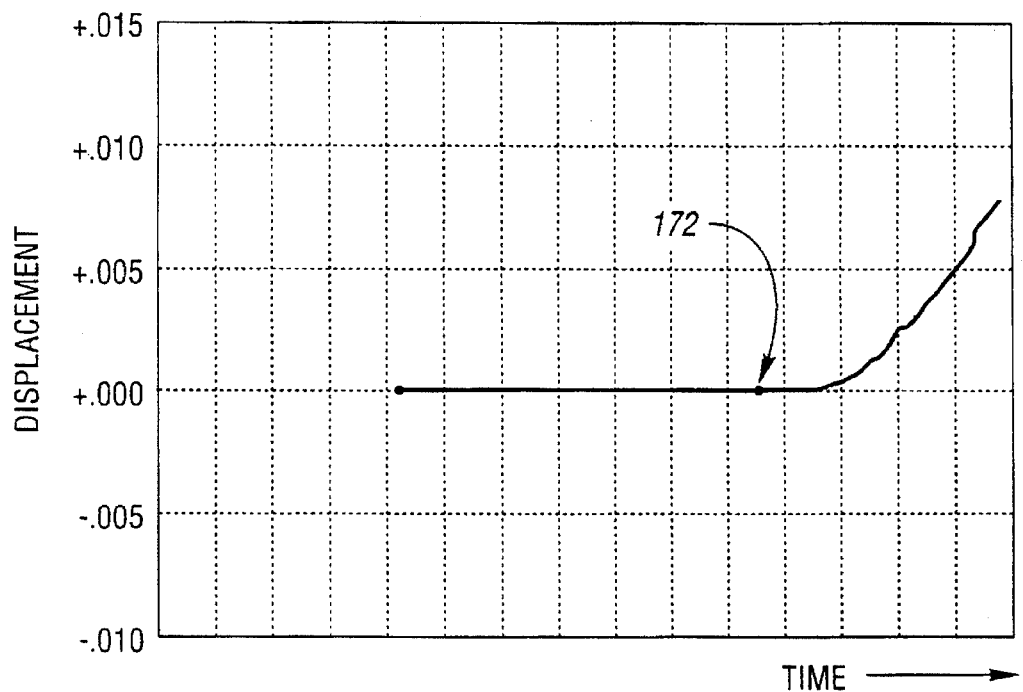
Figure 5D:
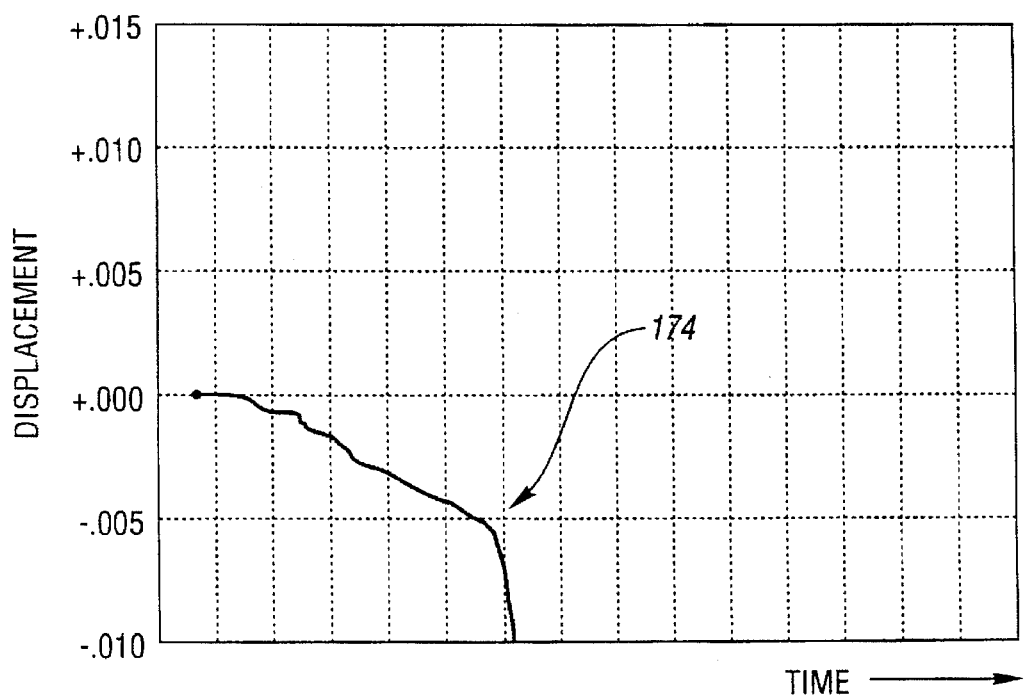

If projections 44 do not sufficiently penetrate workpiece 38 after a preset amount of time, as presented by the displacement voltage characteristic in FIG. 5c due to some factor such as a failed transformer or the presence of oil or other contaminants on the surface of projection weld nut 36 or workpiece 38, the weld voltage is cut-off at 172 and computer 12 indicates a fault. If the displacement of electrode 32 and 34 increases dramatically as presented by the displacement voltage characteristic in FIG. 5d at 174, due to some factors such as over heating projection weld nut 36 at the end of the cycle time, the weld voltage is cut-off and a fault is indicated.

A further condition that can be detected using an embodiment of the present invention is the condition of electrode cladding. This condition is of concern when resistance welding workpieces made of aluminum. The affinity of aluminum to a copper electrode results in an impregnation of molten aluminum to the electrode during welding. When a significant amount of aluminum impregnates into the electrode, the possibility exists of blowing a hole in the workpieces during the next weld. Typically, the exhibited fit-up behavior leading up to such a condition is one where steady wear on the electrode contact face is present for a number of welds, followed by a significant apparent growth on the electrode contact face after a single weld. In addition to space gauging, the present invention can examine the differences in the spacing of electrodes 32 and 34 when they initially form the closed welding position over successive welds to detect the condition of electrode cladding. After detecting such a condition, the electrode can be either replaced or redressed before any further welds are performed by the electrode.

Figure 6A:
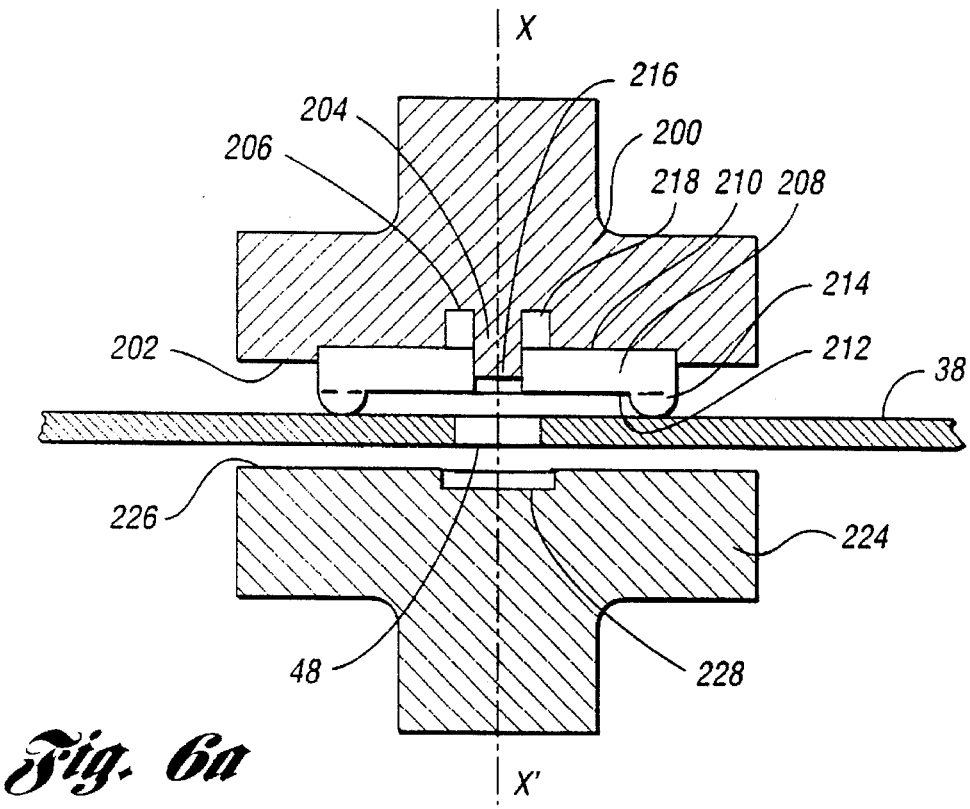
FIG. 6a is a cross-sectional view of an alternative projection weld nut and electrode assembly in accordance with the present invention.

In order to appreciate how the welding system and method of the present invention is not limited to a specific type of projection weld nut, an alternative projection weld nut and electrode assembly is shown in cross sectional view in FIG. 6a. First electrode 200 has a contact face 202 with a shaft 204. Contact face 202 further includes a groove 206 extending around shaft 204. A projection weld nut 208 has an upper surface 210 and a lower surface 212. Projections 214 extend outward from lower surface 212. Projection weld nut 208 has a bore 216 engaging shaft 204 of first electrode 200. A ring 218 on upper surface 210 engages groove 206. Bore 216 is aligned with aperture 48 to allow a bolt or a fastener to extend through aperture 48. A second electrode 224 has a contact face 226 with a hollowed-out portion 228.

Projection weld nut 208 and workpiece 38 are engaged electrodes 200 and 224. Portion 228 is shaped in such a way as to avoid contact with shaft 204 of first electrode 200 in order to prevent electrical shorts.

Figure 6B:
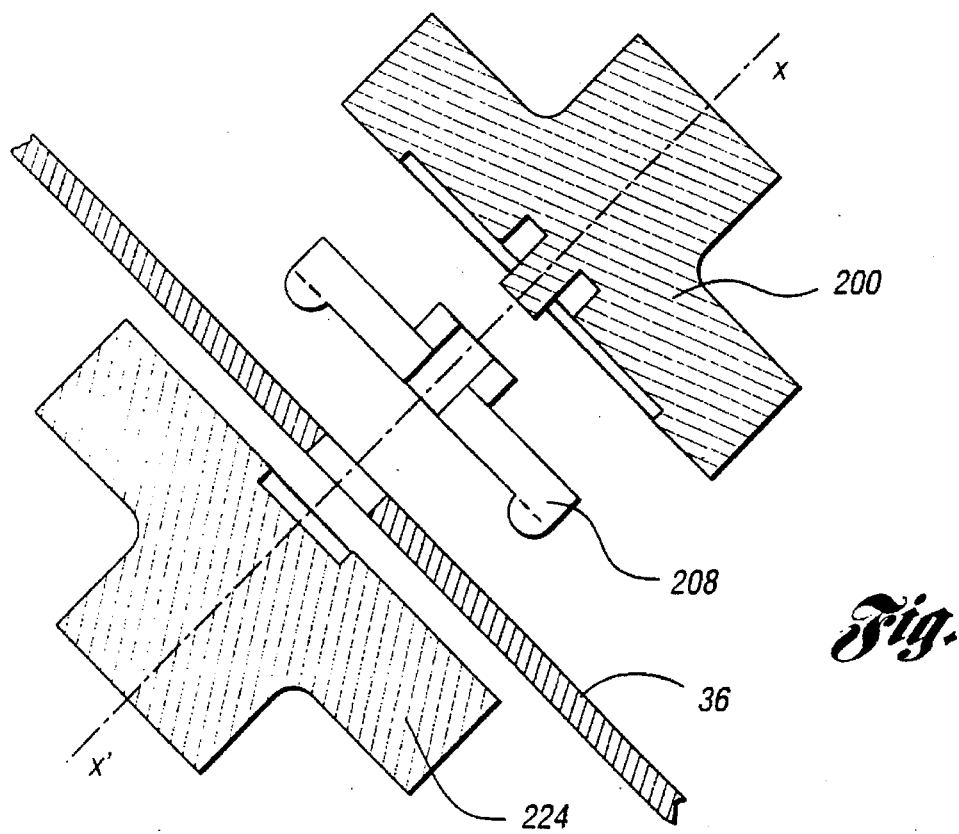

FIG. 6b shows an exploded cross sectional view of the alternative projection weld nut and electrode assembly shown in FIG. 6a taken along the line X–X'.

As can be appreciated, the distance between electrodes 200 and 224 will vary depending upon which surface of projection weld nut 208 engages workpiece 38. These spacing differences can be used by computer 12 to determine whether or not to apply power to electrodes 200 and 224.

Figure 7A:
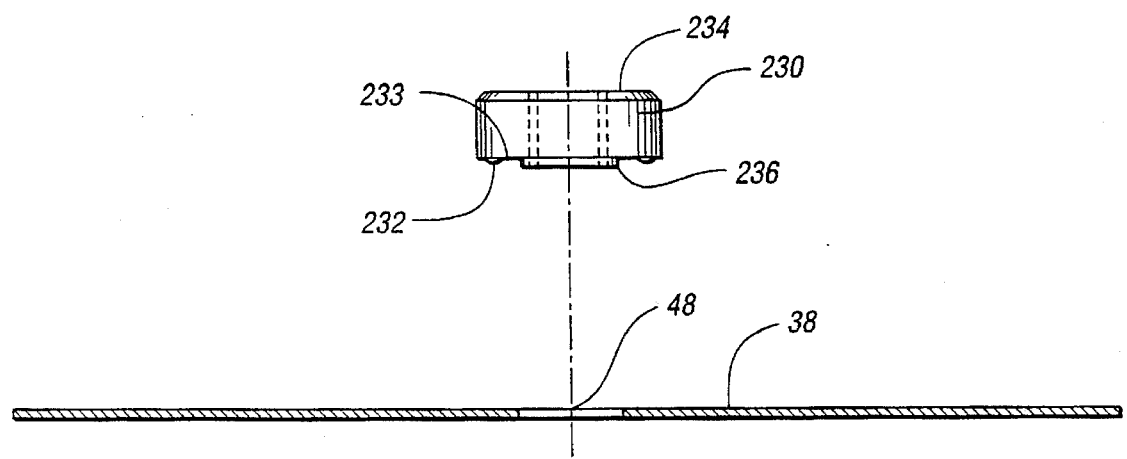
FIG. 7a is a side view of a projection weld nut having a pilot ring.

FIG. 7a shows a side elevation view of yet another embodiment of a projection weld nut. A projection weld nut 230 is shown separated from workpiece 38. Projection weld nut 230 has projections 232 extending from a lower surface 233. Projection weld nut 230 has a bore 234. A pilot ring 236 extends from lower surface 233 and runs substantially around bore 234.

Figure 7B:
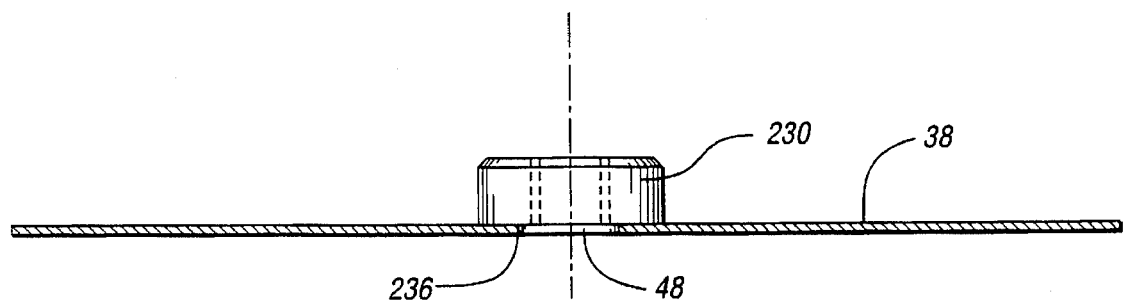
FIG. 7b is a side view of the projection weld nut having a pilot ring properly welded on the workpiece.

FIG. 7b is a side view of projection weld nut 230 properly welded onto workpiece 38. Pilot ring 236 fits snugly into aperture 48. Pilot ring 236 is used to properly align projection weld nut 230 with workpiece 38.

Figure 7C:
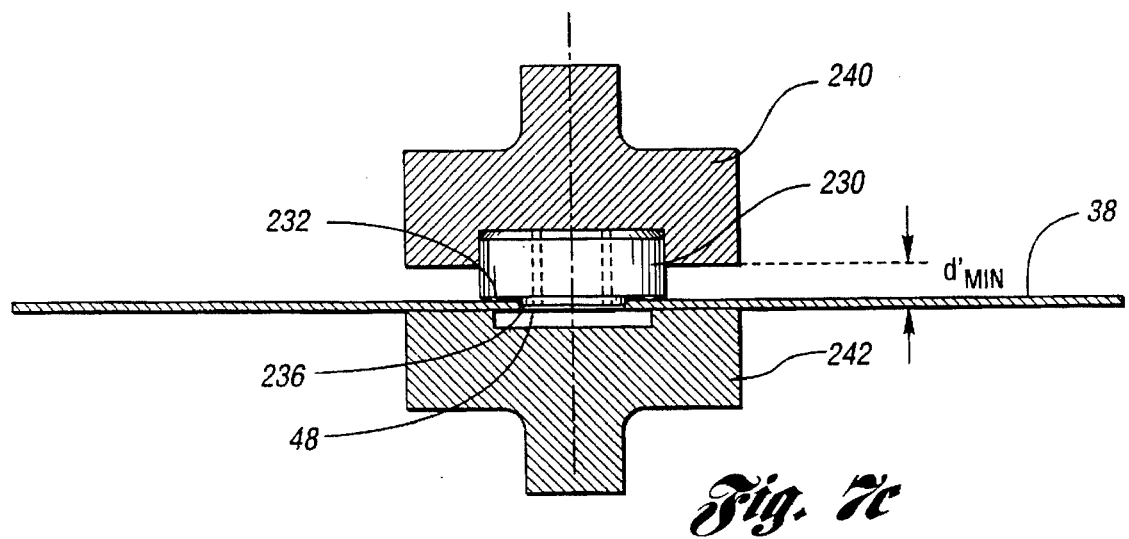
FIG. 7c is a cross-sectional view of electrodes having a distance between them indicative of the projection weld nut being correctly positioned on the workpiece prior to welding.
Figure 7B:
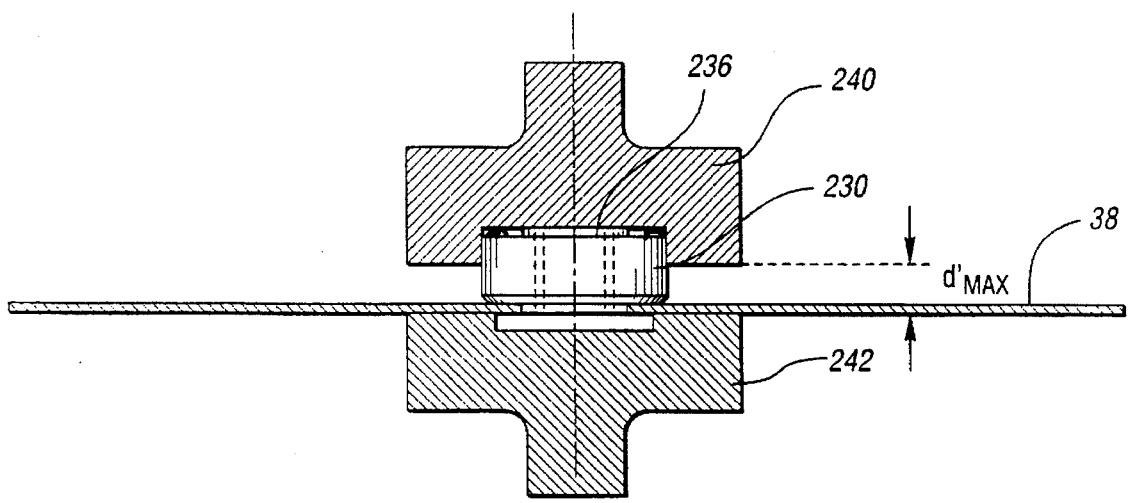

FIG. 7c is a cross-sectional view of a first electrode 240 and a second electrode 242 engaging projection weld nut 230 and workpiece 38 having a distance $d'_{MIN}$ between them prior to welding. The distance $d'_{MIN}$ indicates that projection weld nut 230 is correctly positioned on workpiece 38.

FIG. 7d is a cross-sectional view of electrodes 240 and 242 having a distance $d'_{MAX}$ between them indicative of projection weld nut 230 being in an inverted position on workpiece 38. Pilot ring 236 engages first electrode 240 causing the separation between electrodes 240 and 242 to be equal to the distance $d'_{MAX}$. Note that $d_{MAX}$ is greater than $d'_{MIN}$ by a distance equal to the length of pilot ring 236 extending from projection weld nut 230.

Figure 7E:
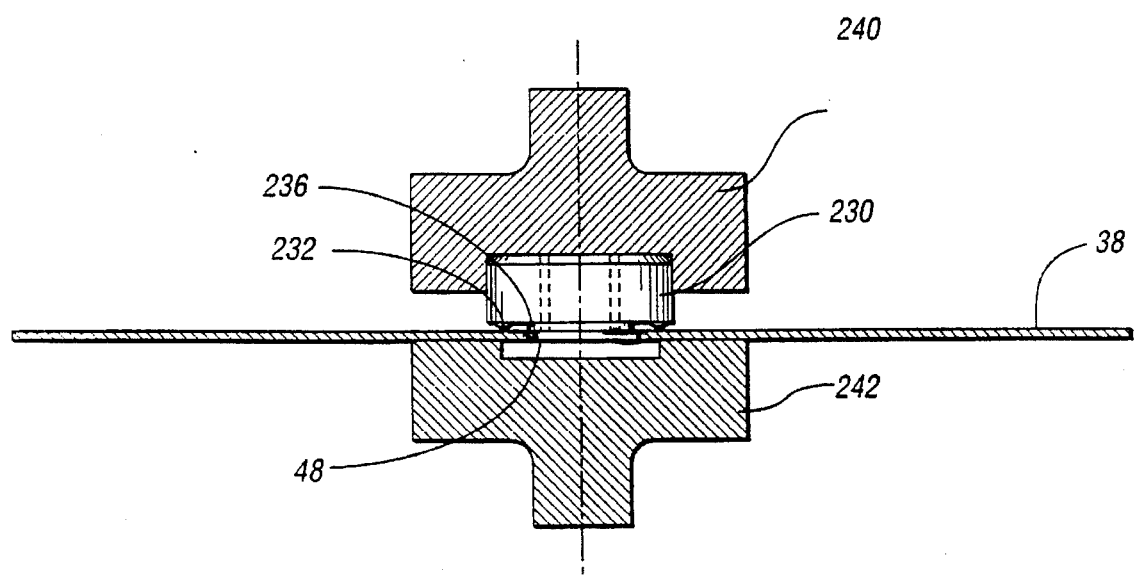
FIG. 7e is a cross-sectional view of electrodes having an improper distance between them because the projection weld nut is laterally out of position prior to welding.

FIG. 7e is a cross-sectional view of projection weld nut 230 being loaded laterally off position with respect to aperture 48 of workpiece 38. Pilot ring 236 is not properly aligned with aperture 48 causing the distance between electrodes 240 and 242 to be different then $d'_{MIN}$. As taught in the preferred embodiment, distance $d'_{MAX}$, $d'_{MIN}$ or other distances can be used by computer 12 as an indicator of whether projection weld nut 230 is properly aligned and in correct contact with workpiece 38, whether projection nut 230 is missing from workpiece 38 or whether projection nut 230 has already been welded to workpiece 38.

In addition to the preferred and alternative embodiments of the present invention, one skilled in the art will see application of this technology beyond the realm of projection weld nut configurations herein described. It should be noted that the present invention may be used in a wide variety of different constructions encompassing many alternatives, modifications, and variations which are apparent to those skilled in the art. Accordingly, the present invention is intended to embrace all such alternatives, modifications, and variations as found within the spirit and broad scope of the appended claims.

What is claimed is:

1. A resistance projection welding system for welding a projection weld nut to a workpiece, wherein said projection weld nut has a first face provided with at least one projection and an opposed second face, said welding system comprising:

a weld power source for supplying power;

a weld gun having a welding electrode coupled to said weld power source, said welding electrode being moveable between a closed welding position for electrical welding contact between said projection weld nut and said workpiece, and an opened position for receiving and removing said projection weld nut and said workpiece;

a displacement sensor coupled to said weld gun for generating a signal responsive to an orientation of said welding electrode relative to said workpiece; and a computer coupled to said weld power source and to said displacement sensor, said computer processes said displacement sensor signal to determine which face of said projection weld nut engages said workpiece, wherein said computer transmits a control signal to said weld power source which prevents the initiation of power if said second face of said projection weld nut engages said workpiece.

2. The welding system of claim 1 wherein said weld gun further comprises a second electrode electrically coupled to said workpiece.

3. The welding system of claim 1 wherein said weld gun further comprises a cylinder assembly having a cylinder housing, and a piston and a piston rod attached thereto for linearly displacing said welding electrode.

4. The welding system of claim 3 wherein said displacement sensor comprises:

an electrode position bracket which is mechanically coupled to said piston rod, but electrically isolated from said welding electrode of said weld gun; and a linear variable displacement transducer, coupled to said cylinder housing of said weld gun, for measuring relative position of said electrode position bracket with respect to said cylinder housing and for generating said displacement sensor signal in proportion to said orientation of said welding electrode relative to said workpiece, wherein said transducer is displaced from, and parallel to an axis aligned with said piston rod.

5. The welding system of claim 1 further comprising a vibrational projection weld nut feeder responsive to said PLC and coupled to said weld gun, said vibrational feeder for supplying a steady stream of projection weld nuts to said welding electrode of said weld gun upon being triggered by said PLC.

6. The welding system of claim 1 further comprising a programmable logic controller (PLC) coupled to said weld power source, to said weld gun, and to said computer.

7. The welding system of claim 6 wherein said weld power source comprises:

a weld controller responsive to said PLC and electrically coupled to said weld gun, for providing an application of electrical power to said welding electrode, wherein said PLC controls and terminates the electrical power from said weld controller to said welding electrode in real time based upon said displacement sensor signal provided to said computer.

8. The welding system of claim 7 wherein said weld power source further comprises:

a silicon controlled rectifier (SCR) coupled to said weld controller for providing a high voltage, low current electrical power signal; and a transformer coupled to said SCR and said weld gun, for converting said high voltage, low current electrical power signal from said SCR into a low voltage, high current electrical power signal for said weld gun.

9. The welding system of claim 8 further comprising:

a plurality of SCRs individually coupled to said weld controller;

a plurality of displacement sensors individually coupled to said computer; and a plurality of weld guns each having a welding electrode, wherein each of said weld guns is individually coupled to one of said SCRs through said transformer for receiving electrical power and each of said displacement sensors is individually coupled to one of said weld guns for monitoring said orientation of said welding electrodes.

10. The welding system of claim 1 wherein said welding electrode has an annular groove which fits over said at least one projection when said first face engages said welding electrode causing the distance between said welding electrode and said workpiece to be smaller than the distance between said welding electrode and said workpiece when said second face engages said welding electrode.

11. A resistance projection welding system for welding a projection weld nut having a first surface provided with a pilot ring and a second surface to a workpiece only if said pilot ring abuts and is properly aligned to said workpiece, said welding system comprising:

a weld power source for supplying power;

a weld gun having a welding electrode coupled to said weld power source, said welding electrode being moveable between a closed welding position for electrical welding contact between said projection weld nut and said workpiece, and an opened position for receiving and removing said projection weld nut and said workpiece;

a displacement sensor coupled to said weld gun for generating a signal responsive to an orientation of said welding electrode relative to said workpiece; and a computer coupled to said weld power source and to said displacement sensor, said computer processes said displacement sensor signal to monitor said orientation of said welding electrode relative to said workpiece, said computer transmits a control signal to said weld power source to inhibit the application of power from said weld power source to said welding electrode if said first surface with said pilot ring of said projection weld nut engages said welding electrode and to initiate the application of power from said weld power source to said welding electrode if said second surface of said projection weld nut engages said welding electrode.

12. The welding system of claim 11 wherein said weld gun further comprises a cylinder assembly having a cylinder housing, and a piston and a piston rod attached thereto for linearly displacing said welding electrode.

13. The welding system of claim 12 wherein said displacement sensor comprises:

an electrode position bracket which is mechanically coupled to the piston rod, but electrically isolated from said welding electrode of said weld gun; and a linear variable displacement transducer, coupled to said cylinder housing of said weld gun, for measuring relative position of said electrode position bracket with respect to said cylinder housing and for generating said displacement sensor signal in proportion to said orientation of said welding electrode relative to said workpiece, wherein said transducer is displaced from, and parallel to an axis aligned with said piston rod.

14. The welding system of claim 11 wherein said weld gun further comprises a second electrode electrically coupled to said workpiece.

15. The welding system of claim 11 further comprising a programmable logic controller (PLC) coupled to said weld power source, to said weld gun, and to said computer.

16. The welding system of claim 15 wherein said weld power source comprises:

a weld controller responsive to said PLC and electrically coupled to said weld gun, for providing an application of electrical power to said welding electrode, wherein said PLC controls and terminates the electrical power from said weld controller to said welding electrode in real time based upon said displacement sensor signal provided to said computer in order for said orientation to substantially simulate a predetermined displacement.

17. The welding system of claim 16 wherein said weld power source further comprises:

a silicon controlled rectifier (SCR) coupled to said weld controller for providing a high voltage, low current electrical power signal; and a transformer coupled to said SCR and said weld gun, for converting said high voltage, low current electrical power signal from said SCR into a low voltage, high current electrical power signal for said weld gun.

18. A resistance projection welding system for welding a desired surface of a projection weld nut having a first and a second dissimilar surface to a workpiece, said welding system comprising:

a weld controller having a first and a second output terminal for providing electrical power;

a weld gun having a first and a second electrode, said first electrode engaging said projection weld nut and being electrically coupled to said first output terminal of said weld controller, said second electrode engaging said workpiece and being electrically coupled to said second output terminal of said weld controller, said first electrode and said second electrode being moveable relative to each other between a closed welding position forming electrical welding contact through said projection weld nut and said workpiece, and an opened position for receiving and removing said projection weld nut and said workpiece;

a displacement sensor coupled to said weld gun for generating a displacement sensor signal proportional to an orientation of said first electrode relative to said second electrode; and a computer coupled to said weld controller and to said displacement sensor, wherein said computer processes said displacement sensor signal to determine which surface of said projection weld nut engages said workpiece, said computer transmits a control signal to said weld controller for initiating an application of electrical power from said weld controller to said electrodes if said first surface of said projection weld nut engages said workpiece and for inhibiting said application of electrical power from said weld controller to said electrodes if said second surface of said projection weld nut engages said workpiece.

19. The welding system of claim 18 wherein said welding system further comprises:

a silicon controlled rectifier (SCR) coupled to said weld controller for providing a high voltage, low current electrical power signal; and a transformer coupled to said SCR and said weld gun, for converting said high voltage, low current electrical power signal from said SCR into a low voltage, high current electrical power signal for said weld gun.

20. The welding system of claim 18 further comprising a programmable logic controller (PLC) coupled to said weld power source, to said weld gun, and to said computer, wherein said PLC controls said weld controller between an on state for applying electrical power and an off state for inhibiting electrical power.

21. The welding system of claim 20 wherein said PLC varies and terminates the electrical power from said weld controller to said electrodes in real time based upon said displacement sensor signal provided to said computer in order for said orientation to substantially simulate a predetermined displacement.

22. A method for welding a projection weld nut to a workpiece utilizing a weld controller, a computer, a projection weld nut feeder, and a weld gun having a welding electrode being moveable between a closed welding position for electrical contact between said projection weld nut and said workpiece, and an opened position for receiving and removing said projection weld nut and said workpiece, wherein said projection weld nut has a first face and a second face, said welding method comprising the steps of:

positioning said projection weld nut and said workpiece within said welding electrode of said weld gun when said welding electrode is in said opened position by utilizing said projection weld nut feeder;

shifting said welding electrode to said closed position in response to a first instruction from said computer thereby forming an electrical contact between said projection weld nut and said workpiece;

generating a signal responsive to an orientation of said welding electrode relative to said workpiece by utilizing a displacement sensor;

determining which face of said projection weld nut engages said workpiece by utilizing a computer responsive to said displacement sensor;

transmitting a signal from said computer to said weld controller for initiating an application of electrical power from said weld controller to said welding electrode if said first face of said projection weld nut engages said workpiece and for inhibiting an application of electrical power from said weld controller to said welding electrode if said second face of said projection weld nut engages said workpiece; and shifting said welding electrode to said opened position in response to a second instruction from said computer for receiving and removing said projection weld nut from said welding electrode.

23. The welding method of claim 22 further comprising the steps of:

determining whether said orientation of said welding electrode corresponds to a predetermined displacement by utilizing said computer; and transmitting said control signal from said computer to said weld controller for controlling and terminating the power from said weld controller to said welding electrode in real time based upon said displacement sensor signal provided to said computer in order for said orientation to substantially simulate the predetermined displacement.

24. The welding method of claim 22 further comprising the steps of:

determining whether said welding electrode has returned to said opened position in response to said second instruction from said computer; and generating an alarm if said welding electrode has not returned to said opened position.

\* \* \* \* \*